United States Patent [19]

Satou et al.

[11] Patent Number: 4,701,679
[45] Date of Patent: Oct. 20, 1987

[54] METHOD OF AND APPARATUS FOR CONTROLLING AMOUNT OF ELECTRON BEAM IN IMAGE PICKUP TUBE

[75] Inventors: Kazuhiro Satou; Koji Kudo; Masanori Maruyama; Itaru Mimura; Shusaku Nagahara, all of Tokyo, Japan

[73] Assignee: Hitachi, Ltd., Tokyo, Japan

[21] Appl. No.: 893,827

[22] Filed: Aug. 6, 1986

[30] Foreign Application Priority Data

Aug. 23, 1985 [JP] Japan ................. 60-183950
Oct. 21, 1985 [JP] Japan ................. 60-233406
Feb. 10, 1986 [JP] Japan ................. 60-25855

[51] Int. Cl.$^4$ .................. G01S 3/16; G01S 3/28; G01S 1/00
[52] U.S. Cl. ............................. 315/383; 358/219
[58] Field of Search .............. 315/383, 10; 358/219

[56] References Cited

U.S. PATENT DOCUMENTS 3,999,011 12/1976 Sato et al. ................. 358/219
4,151,552 4/1979 Sato et al. ................. 358/219
4,306,251 12/1981 Safar ......................... 358/219

FOREIGN PATENT DOCUMENTS 205382 11/1983 Japan ....................... 358/219

Primary Examiner—Theodore M. Blum
Attorney, Agent, or Firm—Antonelli, Terry & Wands

[57] ABSTRACT

In an image pickup tube including a cathode, a first grid electrode disposed as a next stage of the cathode and provided with an aperture, a second grid electrode disposed as a next stage of the first grid electrode and provided with an aperture, and a photoconductive target, the first grid electrode is operated by a voltage positive with respect to the cathode. To control the amount of the electron beam of the image pickup tube, a voltage corresponding to a signal current obtained from the photoconductive target of the image pickup tube or to a return beam from the photoconductive target is applied to the second grid electrode in such a manner that a polarity of the applied voltage is opposite to a polarity of a signal charge generated on the photoconductive target.

18 Claims, 17 Drawing Figures

METHOD OF AND APPARATUS FOR CONTROLLING AMOUNT OF ELECTRON BEAM IN IMAGE PICKUP TUBE

BACKGROUND OF THE INVENTION

The present invention relates to a method and an apparatus for controlling the amount of a scanning electron beam of an image pickup tube having a reduced image lag and a diode type electron gun.

In a photoconductive image pickup tube, an electric charge pattern corresponding to a scene illuminance is generated on a photoconductive layer, and then the surface of the photoconductive layer is scanned by an electron beam emitted from an electron gun, so that the electric pattern is subjected to a sequential discharge and that a charge current corresponding to the discharge is externally obtained as a signal. For such a photoconductive image pickup tube, it has ben desired to reduce the image lag and to expand the range of light quantity.

The image lag is produced because the electric charge generated for a scene cannot be completely discharged by a beam scanning operation and the remaining charges are also read in the next and subsequent scanning operations. Particularly in an image pickup tube using a blocking type photoconductive layer, the image lag is mainly caused due to a capacitive signal lag associated with a time constant determined by the product of the static capacitance of the photoconductive layer and the beam resistance related to the scanning electron beam.

To lower the beam resistance, it is indispensable to narrow the velocity distribution of electrons forming the electron beam. The electrons emitted from a cathode have a velocity distribution according to the Maxwellian distribution. It has been known that the current density of the beam is increased in a process for generating a narrow beam and that the velocity distribution becomes broader due to the energy relaxation phenomenon due to coulomb force interaction between the electrons. This is called Boersh effect and the expansion rate of velocity distribution is known to be substantially in proportion to $J(Z)^{\frac{1}{3}}$, where the current density of the electron beam on its axis is $J(Z)$. Consequently, to provide an image pickup tube with a low image lag, the increase of the beam current density must be minimized to the possible extent. To this end, there has been proposed a diode type electron gun in which a first grid electrode opposing a cathode is set to a positive voltage with respect to the cathode, which emits electrons in a direction parallel to the axis of the image pickukp tube, thereby preventing formation of a crossover having a high current density (for example, Japanese patent application Laid-Open Nos. 50-39869 and 54-129871 and U.S. Pat. Nos. 3,894,261 and 4,388,556).

FIG. 12 is a schematic diagram illustrating an example of a diode type electron gun (This electron gun is proposed in the pending U.S. patent application Ser. No. 755,014.) satisfying the gist described above which includes a cathode 1 and a first grid electrode 2 having an aperture 2a and being supplied with a voltage $E_1$ positive with respect to the cathode 1. Reference numeral 3 denotes a second grid electrode having an aperture 33 smaller than the aperture 2a of the first grid electrode 2 and being supplied with a positive voltage $E_2$ higher than the voltage $E_1$. Reference numeral 4 indicates a generated electron beam. When the voltage $E_1$ is variable, the electron beam 4 can be changed from a laminar flow electron beam illustrated with dashed lines into a crossover beam depicted with solid lines. FIG. 13 is a graph illustrating the relationships between the first grid voltage $E_1$ and the beam current generated by the electron beam received by a photoelectric conversion layer (photoconductive target). Point A is the ordinary operating point where the laminar flow electron beam is formed and the image lag can be reduced, whereas the crossover is developed at point B. As described above, the image pickup tube having the electron gun of FIG. 12 enables to obtain a large beam current because of the variable first grid voltage $E_1$, thereby achieving the Automatic Beam Optimizer (ABO) operation in which the amount of an electron beam is controlled corresponding to the scene illuminance.

The U.S. Pat. No. 4,540,916 proposed a diode type electron gun in which an intermediate electrode is provided between the first and second grid electrodes so as to be especially suitable for the ABO operation.

The ABO operation has been described in the U.S. Pat. Nos. 3,975,657; 3,999,011; and 4,151,552.

FIG. 14 is a simplified circuit diagram illustrating the conventional ABO circuit comprising an image pickup tube 10 having a diode type electron gun as shown in FIG. 12. According to the conventional method, a signal current obtained from a photoconductive target 11 through an electron beam scanning is converted into a voltage by use of a resistor 12. The voltage is then amplified by an amplifier 13 and then the resultant voltage is added to a reference bias voltage 15 by an adder 14. The output voltage of adder 14 is in turn applied to a beam current control electrode (first grid electrode) 2. The following relationships hold in this circuit.

$$V_S = -I_S \cdot R_S \quad \text{-----(1)}$$

$$V_0 = B \cdot V_S \quad \text{-----(2)}$$

$$E_{G1} = V_0 + V_{01} \quad \text{-----(3)}$$

where, $V_S$ is an input signal voltage of the amplifier 13, $I_S$ is the signal current, $R_S$ is a resistance value of the resistor 12, $V_0$ is an output signal voltage of the amplifier 13, B is the amplification factor of the amplifier 13, $E_{G1}$ is the beam current control electrode voltage (first grid electrode voltage), and $V_{01}$ is the reference bias voltage.

Assuming the ratio between the beam current control electrode voltage and the beam current to be $gm_1$, the following relationships are satisfied.

$$I_B = -gm_1 \cdot E_{G1} \quad \text{-----(4)}$$

$$I_{01} = -gm_1 \cdot V_{01} \quad \text{-----(5)}$$

where, $I_B$ is the scanning beam current and $I_{01}$ is the bias value of the scanning beam current.

From the five expressions described above, $I_B$ can be expressed as follows:

$$I_B = A \cdot I_S + I_{01} \quad \text{-----(6)}$$

where, $A = gm_1 \cdot R_S \cdot B$. Expression (6) indicates the control characteristic of the scanning beam current of the circuit shown in FIG. 14. The ideal ABO operation is possible when $A = 1$ is satisfied. The circuit, however, has three problems.

The first problem is that if a capacitive coupling as denoted by reference numeral 17 exists between the first grid electrode 2 and the photoconductive target 11 of the image pickup tube 10, a positive feedback circuit is formed as shown in FIG. 15, which leads to an oscillation. This oscillation occurs because the (negative) polarity of the signal voltage applied to the first grid electrode 2 is the same as that of the signal charge generated at the photoconductive target 11 and hence the signal mixed by the capacitive coupling is added at the photoconductive target 11 with the same polarity.

The second problem is that when the beam control circuit of FIG. 14 is set to a state in which the beam is insufficient during the operation, an oscillation may take place depending on the circuit condition. In this state, the signal current is independent of the information of light and increases in proportion to the beam current, and hence the circuit of FIG. 14 becomes identical to a positive feedback circuit. Assuming the proportional constant between the signal current and the electron beam current to be F, then $$I_S = F \cdot I_B \qquad \qquad (7)$$

results. From the expressions (6) and (7), the following relationship is extracted.

$$I_S = \frac{I_{01}}{1 - A \cdot F} \qquad (8)$$

The oscillation condition of the positive feedback circuit is determined by the denominator of the expression (8), and the oscillation does not occur for $AF < 1$. Although the value of F varies depending on the characteristics and state of the photoconductive layer (photoconductive target) 11, this value is almost one; and to prevent the oscillation, it must be considered to satisfy the condition of $A < 1$ or to avoid the insufficient beam state.

The condition of $A < 1$ can be realized by lowering the amplification factor B of the amplifier 13; however, since the value of gm changes with the voltage applied to the first grid electrode 2, the value of B must be determined for the maximum value of gm. As a result, there appears a disadvantage that the amplification factor becomes insufficient and the control range is reduced at the operating point where the value of gm is minimum.

The third problem is that when the amount of an electron beam is increased, the beam resistance soars, and hence the image lag is increased. In the diode type electron gun of FIG. 12, if the first grid voltage $E_1$ is changed to increase the amount of the electron beam, then the electron beam changes from the laminar flow of electron beam illustrated with dashed lines to the crossover beam depicted with solid lines. The crossover beam has a high current density and consequently develops a high beam resistance, which leads to a disadvantageous result that the image lag is increased.

SUMMARY OF THE INVENTION

It is therefore an object of the present invention to provide a method and an apparatus for controlling the amount of the electron beam of an image pickup tube which enables a stable ABO operation even if a capacitive coupling exists between the grid electrode and the photoconductive target.

Another object of the present invention is to provide a method and an apparatus for controlling the amount of the electron beam of an image pickup tube which is capable of preventing the increase of the image lag even if the amount of the electron beam is increased.

Still another object of the present invention is to provide a method and an apparatus for controlling the amount of the electron beam of an image pickup tube which performs a stable operation without causing an oscillation even when there exists a capacitive coupling between the first grid electrode and the photoconductive target and the beam becomes insufficient during the ABO operation.

According to the present invention, in an image pickup tube including a cathode emitting electrons, a first grid electrode having an aperture and being disposed as a next stage of the cathode, a second grid electrode having an aperture and being disposed as a next stage of the first grid electrode, and a photoconductive target, said first grid electrode is operated with a voltage positive to said cathode. Moreover, a signal voltage is generated corresponding to a signal current extracted from said photoconductive target. Said signal voltage is applied to said second grid electrode with a polarity opposite to a polarity of a signal charge generated on said photoconductive target, thereby implementing a stable ABO operation.

According to an embodiment of the present invention, said signal voltage is applied to the first and second grid electrodes, where an amplitude of the signal voltage applied to the first grid electrode is smaller than an amplitude of the signal voltage applied to the second grid electrode, which enables to effect a beam current control with the electron beam set as a laminar flow electron beam. The increase of the image lag is thus prevented.

According to another embodiment of the present invention, the first grid electrode is operated with a voltage positive with respect to the cathode and a signal voltage corresponding to a return beam from the photoconductive target is generated. The generated signal voltage is applied to the second grid electrode with a polarity opposite to a polarity of the signal charge generated on the photoconductive target. This enables to conduct a stable ABO operation even if the beam becomes insufficient.

BRIEF DESCRIPTION OF THE DRAWINGS

The present invention will be apparent from the following detailed description taken in conjunction with the accompanying drawings in which.

DETAILED DESCRIPTION OF THE PREFERRED EMBODIMENTS

Figure 1:
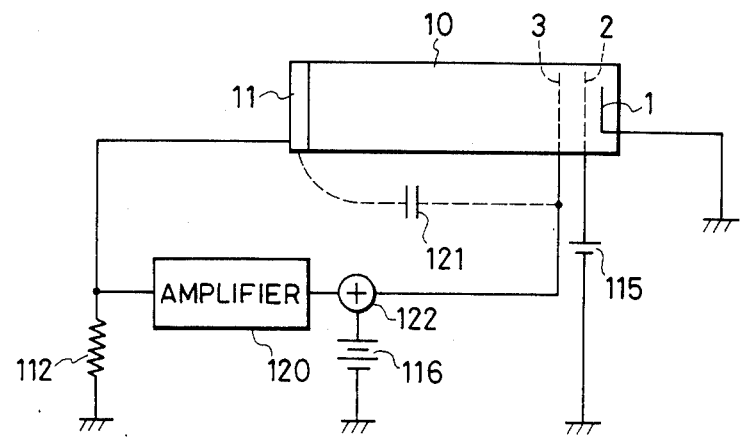
FIG. 1 is a schematic circuit diagram of a first embodiment of the present invention.
Figure 2:
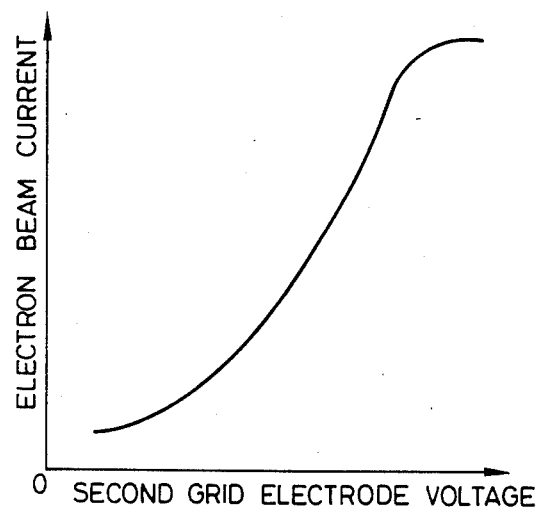
FIG. 2 is a graph illustrating the relationships between the second grid electrode voltage and the electron beam amount of the first embodiment.

Embodiments of the present invention will be described with reference to the accompanying drawings. FIG. 1 is a schematic circuit diagram showing a first embodiment of the present invention and FIG. 2 is a graph depicting the relationships between the second grid electrode voltage and the electron beam amount. In FIG. 1, an image pickup tube 10 includes a cathode 1, a first grid electrode 2, a second grid electrode 3, and a photoconductive target 11. The signal current is attained by scanning the photoconductive target 11 with an electron beam. The signal current is converted by a resistance 112 into a voltage, which is then amplified by an amplifier 120 and is added to a bias voltage 116 by an adder 122, then the resultant voltage is applied to the second grid electrode, thereby automatically controlling the amount of the scanning beam current according to the change of the signal current. The circuit of FIG. 1 is characterized in that the polarity of the input signal and that of the output signal are reversed by the amplifier 120, namely, the polarity of the signal applied to the second grid electrode 3 is set to be opposite to the polarity of the signal generated at the photoconductive target 11.

Figure 13:
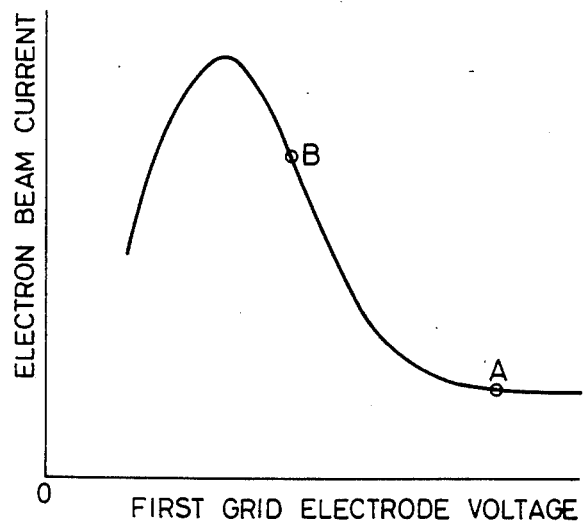
FIG. 13 is a graph showing the relationships between the first grid electrode voltage and the beam current.
Figure 14:
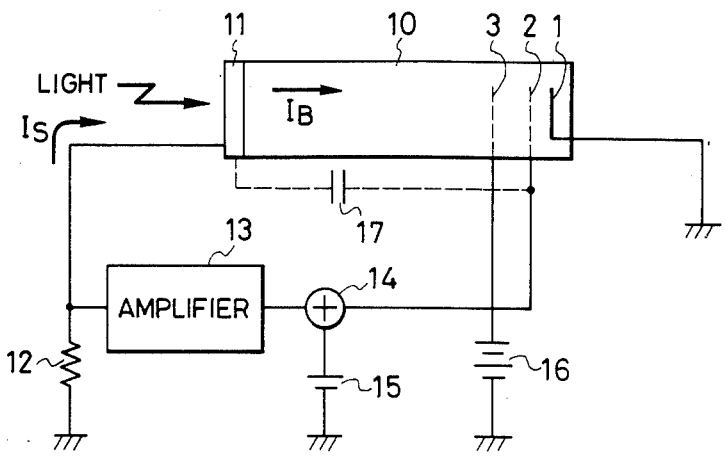
FIG. 14 is a schematic circuit diagram demonstrating the conventional circuit for controlling the electron beam amount.
Figure 15:
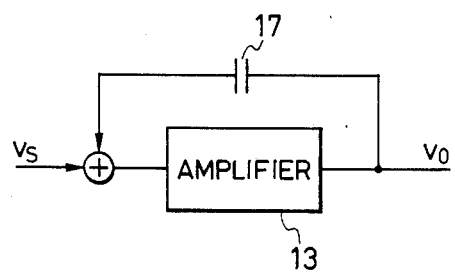
FIG. 15 is a schematic circuit diagram illustrating an equivalent circuit of that of FIG. 14 when a static capacitive coupling occurs.

In the conventional ABO circuit as shown in FIG. 14, the beam current amount is controlled by the first grid electrode; consequently, to increase the beam current amount, a signal which lowers the electrode voltage according to the characteristic shown in FIG. 13, namely, a signal voltage having a negative polarity must be applied. As a consequence, a signal having the same phase as that of the negative-polarity signal charge generated by the photoconductive target 11 enters the photoelectric conversion layer due to the capacitive coupling, which causes the oscillation. In contrast to this method, the method for controlling the amount of the electron beam according to the present invention controls the beam amount by the voltage applied to the second grid electrode 3; however, the relationships between the second grid electrode voltage and the electron beam are as shown in FIG. 2, namely, the electron beam amount increases with the second grid electrode voltage, and hence it is necessary only to apply a signal voltage having a positive polarity to the second grid electrode. For the negative-polarity signal charge on the photoconductive target 11, the positive-polarity signal voltage is applied to the second grid electrode 3; consequently, even if the capacitive coupling indicated by the reference numeral 121 of FIG. 1 takes place, the positive feedback circuit is not formed, namely, a negative feedback circuit is established, which allows a stable ABO operation and enables the beam amount control to be effected corresponding to the scene illuminance.

Figure 3:
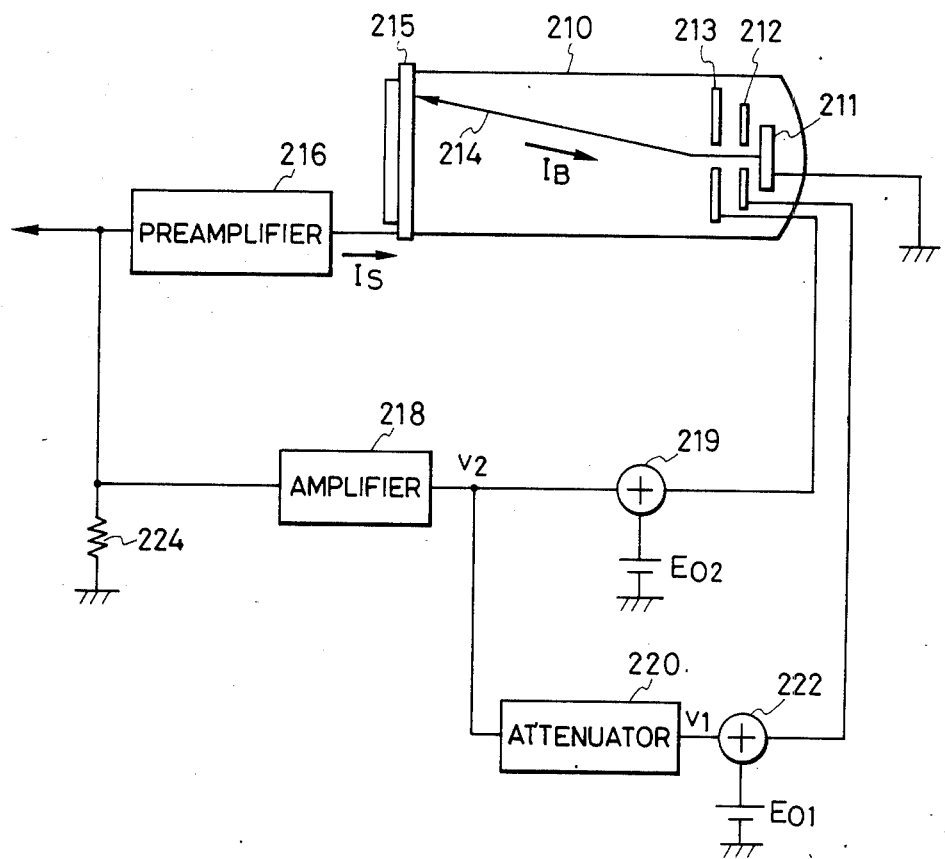
FIG. 3 is a simplified circuit diagram showing a second embodiment of the present invention.
Figure 4A:
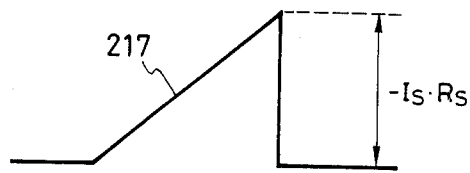
FIGS. 4A–4C are graphs depicting voltage waveforms at the respective points of the circuit of FIG. 3.
Figure 4B:
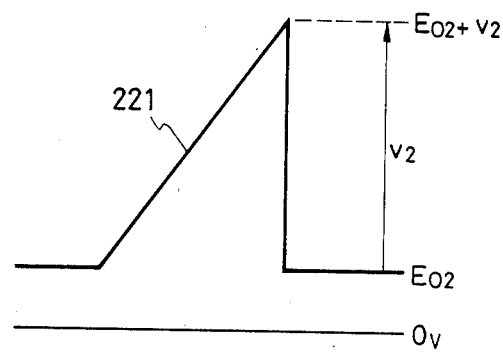
Figure 4C:
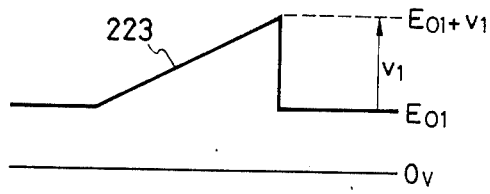

FIG. 3 is a schematic circuit diagram illustrating a second embodiment of the present invention, whereas FIGS. 4A–4C are graphs illustrating voltage waveforms at the respective positions of the circuit of FIG. 3. The configuration of FIG. 3 includes an image pickup tube 210 having a diode type electron gun, a cathode 211, a first grid electrode 212, and a second grid electrode 213. The electric charge pattern on the photoconductive target 215 is scanned by an electron beam 214 emitted from the cathode 211 so as to externally obtain a signal current $I_S$, which is converted into a signal voltage by a preamplifier 216. For the simplification of the explanation, the waveform of the video signal outputted from the preamplifier 216 is assumed to be a sawtooth waveform indicated by reference numeral 217 (FIG. 4A). When amplified by a second amplifier 218, the sawtooth wave 217 gains a voltage of $V_2$, and the resultant sawtooth waveform signal is distributed to an input terminal of an adder 219 and an input terminal of an attenuator 220. The signal applied to the adder 219 is subjected to an addition in the sense of a direct current (dc) to a reference dc voltage $E_{02}$ (usually set to 100–300 V) of the second grid 213, thereby obtaining the voltage indicated by reference numeral 221 (FIG. 4B), which is then applied to the second grid 213. On the other hand, the signal fed to the attenuator 220 is attenuated to be 1/n thereof, namely, level of $V_1$, where n is a positive number and 1/n ranges from ⅓ to 1/15. This is selected to be 1/10 in this embodiment. In the adder 222, the output signal from the attenuator 220 is subjected to an addition in the sense of a direct current to the reference voltage $E_{01}$ of the first grid 212, thereby obtaining the voltage indicated by reference numeral 223 (FIG. 4C), which is then applied to the first grid 212.

Figure 5:
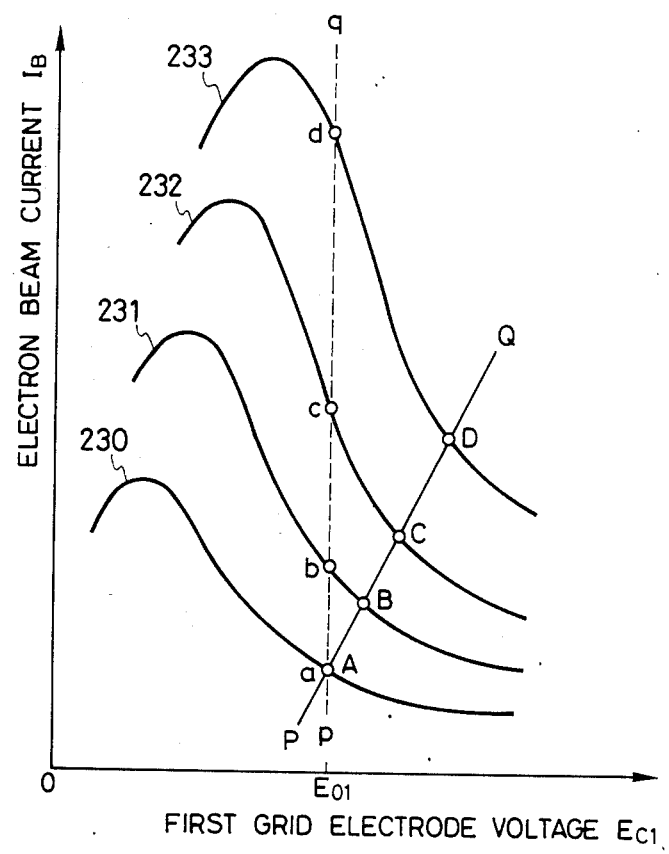
FIG. 5 is a graph illustrating the relationships between the beam current and the first grid electrode, the second grid electrode voltage is set as a parameter.

FIG. 5 is a graph illustrating the relationships between the electron beam current $I_B$ and the first grid voltage $E_{C1}$ of the image pickup tube used according to the present invention. As the second grid voltage is increased with respect to the reference voltage $E_{02}$ applied to the second grid, the state of $I_B$-$E_{C1}$ characteristic is changed as indicated by reference numerals as follows: 230→231→232→233. For example, if the first grid voltage $E_{C1}$ is set to $E_{01}$ and this voltage is kept unchanged, the beam current increases along the line pq (indicated with a dashed line) when the second grid voltage $E_{C2}$ becomes greater. The beam current becomes higher as the second grid voltage $E_{C2}$ increases. This is because the acceleration electric field becomes stronger. Paying attention to the beam state, the laminar flow electron beam appears at point a ($E_{01}$) of the characteristic curve 230; however, the curve shifts with the increase of the second grid voltage, and hence for the same $E_{01}$, the beam current undergoes a transition, b→c→d, and forms a crossover. Consequently, if the first grid voltage $E_{C1}$ is constant, the image lag increases as the second grid voltage $E_{C2}$ becomes higher. On the other hand, since the 1/n of the signal voltage applied to the second grid is also applied to the first grid, the first grid voltage $E_{C1}$ also increases and the beam current $I_B$ tends to decrease. That is, the laminar flow electron beam develops a transition. B→C→D, along the direct line PQ, which enables to increase the beam amount of the laminar flow electron beam without forming the crossover.

Figure 6:
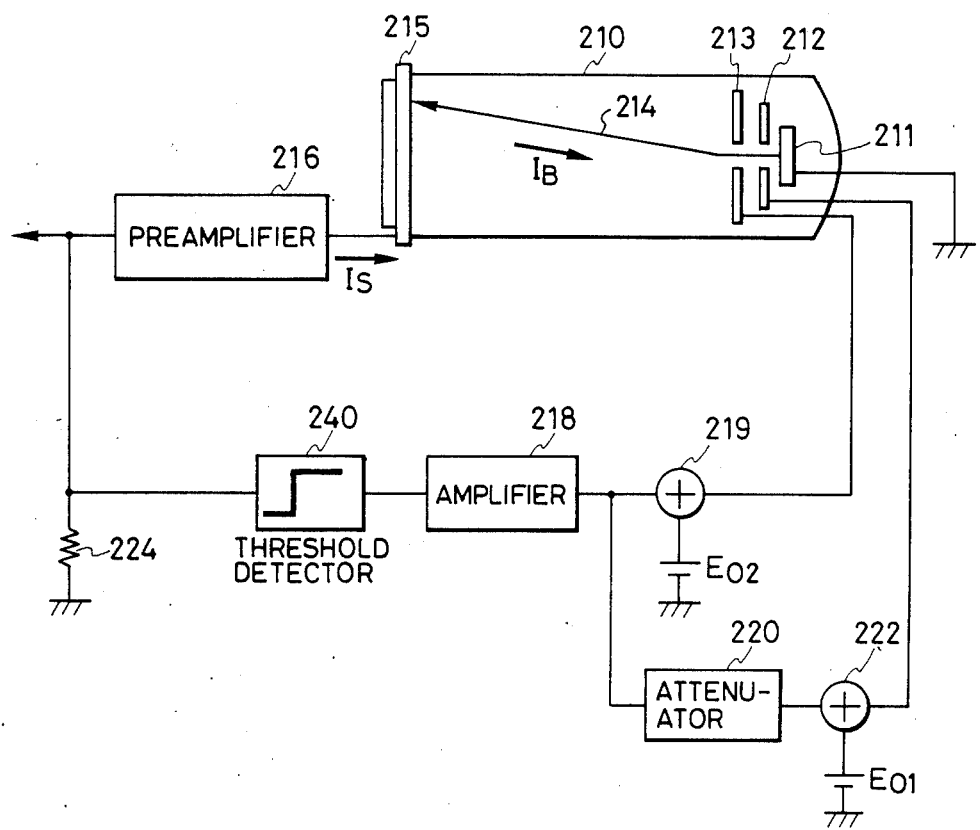
FIG. 6 is a schematic circuit diagram of a third embodiment of the present invention.

FIG. 6 is a schematic circuit diagram showing a third embodiment of the present invention. This embodiment is different from the embodiment of FIG. 3 in that a threshold detector 240 is inserted between the preamplifier 216 and the second amplifier 218. The function of the threshold detector 240 resides in that the signal of which the voltage value is below the predetermined value is cut off so that the pertinent signal voltage is not added to the reference voltage $E_{01}$ applied to the first grid and the reference voltage $E_{02}$ applied to the second grid. The voltages $E_{01}$ and $E_{02}$ are intrinsically set to supply a beam current which is two to three times the current, 0.4 to 0.5 μA, of the standard signal in the ordinary operation; consequently, for the signal (voltage) at most equal to the beam current generated in the ordinary operation, the control voltage need not be added to the reference voltages $E_{01}$ and $E_{02}$. That is, the beam current can be controlled in a range where the electron beam appears as the laminar flow electron beam by adding to the reference voltages $E_{01}$ and $E_{02}$ the signal voltage more than the signal level generated in the ordinary operation. In the FIG. 6, since the remaining components are completely the same as those of FIG. 3, the explanation thereof will be omitted.

Although the threshold detector 240 is inserted between the preamplifier 216 and the second amplifier 218 in the embodiment, the threshold detector may also be located immediately after the second amplifier 218. In this case, the same beam current control can be achieved only be changing the threshold detect level.

According to the second and third embodiments of the present invention, the second grid voltage is increased with respect to the cathode as the scene illuminance becomes higher, control is effected to improve the absolute beam current generation capability of the image pickup tube, and control is further conducted to increase the first grid voltage with respect to the cathode; consequently, the electron beam can be generated as the laminar flow electron beam without forming the crossover, which is particularly effective to suppress the image lag in a highlight scene.

Figure 7:
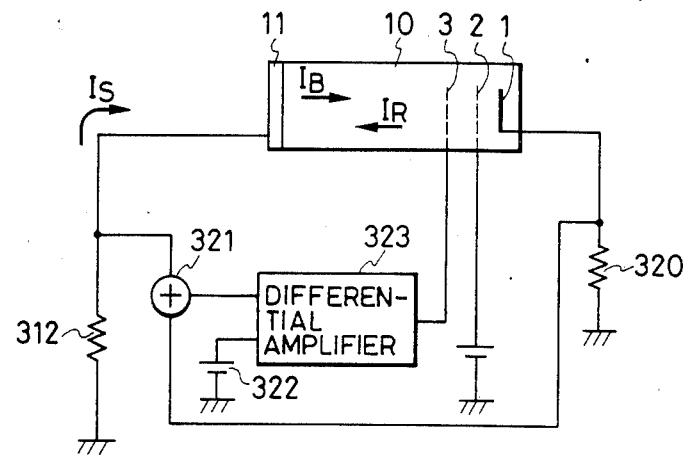
FIG. 7 is a simplified circuit diagram showing a fourth embodiment of the present invention.

FIG. 7 is a schematic circuit diagram illustrating a fourth embodiment of the present invention. In this configuration, most part of a beam current extracted from a cathode 1 of an image pickup tube 10 is absorbed by a first grid electrode 2 and a second grid electrode 3, and a remaining part thereof becomes a scanning beam current $I_B$. A portion of the scanning beam current $I_B$ becomes a signal current $I_S$ on the photoconductive target 11, while the remaining portion thereof becomes a return beam current $I_R$ and is absorbed by the second grid electrode 3. As a consequence, the return beam current $I_R$ is expressed as follows:

$$I_R = I_B - I_S \quad \cdots\cdots (9)$$

Since the actual circuit operates with voltage signals, a voltage signal $V_R$ corresponding to the return beam current $I_R$ is represented by the following expression.

$$V_R = V_B + V_S \quad \cdots\cdots (10)$$

The voltage $V_B$ is a voltage corresponding to the scanning beam current and is detected by use of a resistor 320 inserted between the cathode 1 and the grounding potential. Since the cathode current $I_C$ flows through the resistor 320 and the following expression (11) holds for $I_C$ and $I_B$, the voltage $V_B$ can be represented as follows:

$$I_C = \alpha \cdot I_B \quad \cdots\cdots (11)$$

$$V_B = R_C \cdot \alpha \cdot I_B \quad \cdots\cdots (12)$$

where, α is the proportional constant and $R_C$ is the resistance value of the resistor 320 connected to cathode 1.

On the other hand, the signal current $I_S$ flows through the resistance 312 can cause the signal voltage of the expression (1) to be developed. Consequently, the voltage $V_R$ is obtained from the expressions (1), (10), and (12) as follows:

$$V_R = \alpha \cdot R_C \cdot I_B - R_S \cdot I_S \quad \cdots\cdots (13)$$

This signal can be easily attained by adding the voltages developed at the resistors 312 and 320 by use of the adder 321.

The second grid electrode 3 is supplied with a signal obtained by amplifying by the differential amplifier 323 a difference signal between $V_R$ of the expression (13) and the reference voltage 322, which leads to the following expression.

$$E_{G2} = B(V_{02} - V_R) \quad \cdots\cdots (14)$$

where, $E_{G2}$ is the second grid electrode voltage, B is the amplification factor of the differential amplifier 323, and $V_{02}$ is the reference voltage 322.

Assuming the ratio between the cathode current and the second grid electrode voltage $E_{G2}$ to be $gm_C$, expression (15) holds.

$$E_{G2} = \frac{I_C}{gm_c} \quad (15)$$

For convenience, regarding the reference voltage $V_{02}$ as a current source and assuming $V_{02} = I_{02} R_0$, then the following expression (16) is obtained from the expressions (11), (13), (14) and (15).

$$I_B = \frac{gm_c \cdot B}{\alpha}(I_{02}R_0 + R_S \cdot I_S - \alpha \cdot R_C \cdot I_B) \quad (16)$$

Selecting the value of R to satisfy $R = R_0 = R_S = \alpha \cdot R_C$, the expression (16) is reduced to expression (17).

$$I_B = \frac{A'}{1 + A'}(I_{02} + I_S) \quad (17)$$

where, $A' = gm_C \cdot B \cdot R \cdot \alpha^{-1}$. The expression (17) indicates that as the value of A' increases in the fourth embodiment (FIG. 7) of the present invention, the ABO operation approaches the ideal operation.

Even if the electron beam becomes insufficient during the ABO operation and the expression (7) is satisfied for $I_S$ and $I_B$ so as to form the feedback circuit, the oscillation condition is not met as indicated by the following expression.

$$I_B = \frac{A'I_{02}}{1 + A'(1 - F)} \quad (18)$$

Namely, even in the insufficient beam state, the stable beam control can be effected.

Moreover, even when a capacitive coupling exists between the second grid electrode 3 and the photoconductive target 11, since the polarity of the control signal voltage applied to the second grid electrode 3 is positive and the polarity of the signal charge generated by the photoconductive target 11 is negative, the positive feedback circuit is not established and thus the oscillation does not occur.

Figure 8:
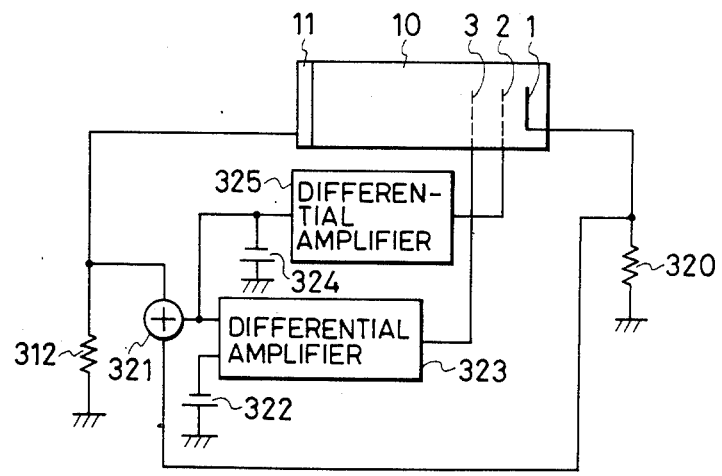
FIG. 8 is a schematic circuit diagram illustrating a fifth embodiment of the present invention.

The fifth embodiment of FIG. 8, like the fourth embodiment, is characterized in that a voltage signal corresponding to the return beam current is applied to the second grid electrode 3 and that the 1/n (n is a positive number) of the control signal applied to the second grid electrode 3 is generated as a voltage signal by a differential amplifier 325 so as to be applied to the first grid electrode 2. In this configuration, reference numeral 324 indicates the reference voltage and the value of 1/n is selected to range from ⅓ to 1/15.

Figure 9:
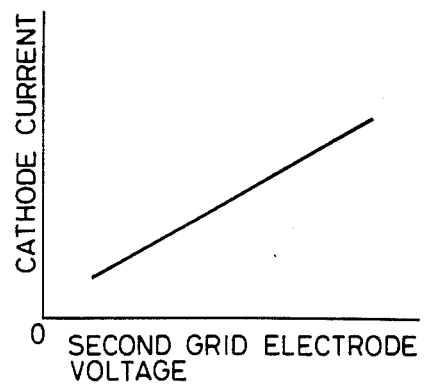
FIG. 9 is a graph depicting the relationships between the second grid electrode voltage and the beam current.
Figure 12:
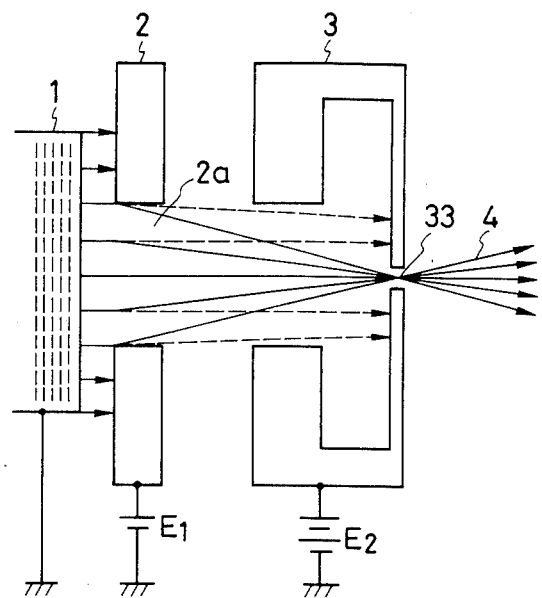
FIG. 12 is a simplified cross-sectional view for explaining a diode type electron gun.

As described above, the ABO circuit of FIG. 7 increases the beam current by changing the beam from the laminar flow electron beam shown by dashed lines in FIG. 12 to the crossover beam illustrated with solid lines. In contrast, the fifth embodiment of FIG. 8 effects the ABO operation in such a fashion that the second grid electrode 3 is supplied with a control voltage of positive polarity and the first grid electrode is also supplied with a positive polarity voltage of which the value is 1/10 of the second grid electrode voltage so as to prevent the formation of the crossover beam, therby achieving the ABO operation for the laminar flow electron beam. Since in this system controlling two electrodes, the voltage of the first grid electrode is controlled subordinately with respect to the second grid electrode voltage, the first and second grid electrodes can be considered to be an electrode, namely, the relationships between the second grid electrode voltage and the beam current are indicated by a direct line as shown in FIG. 9. As a result, the ratio $gm_C$ between the cathode current and the second grid electrode voltage can be almost completely regarded as a constant, which enables to implement a further stable beam operation.

Figure 10:
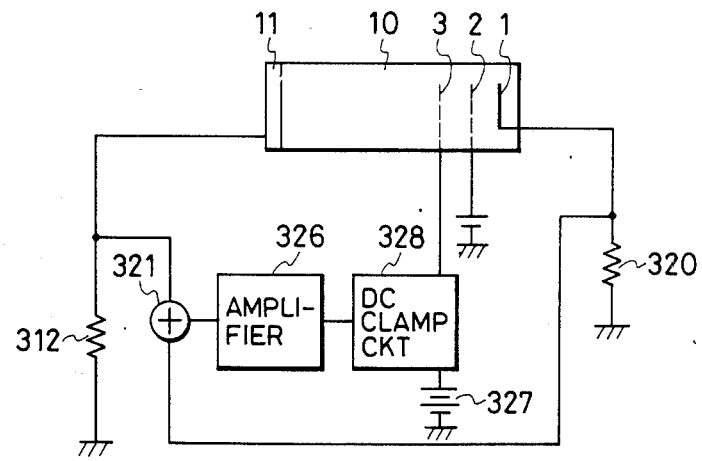
FIG. 10 is a schematic diagram illustrating a sixth embodiment of the present invention.

The sixth embodiment of FIG. 10 is a variation of the circuit of the fourth embodiment in which the signal corresponding to the return beam current is amplified by an amplifier 326 and the obtained voltage is added to the voltage of a bias voltage source 327 by use of a dc clamp circuit 328, and then the resultant voltage is applied to the second grid electrode 3. The ABO operation is the same as that of the fourth embodiment.

Figure 11:
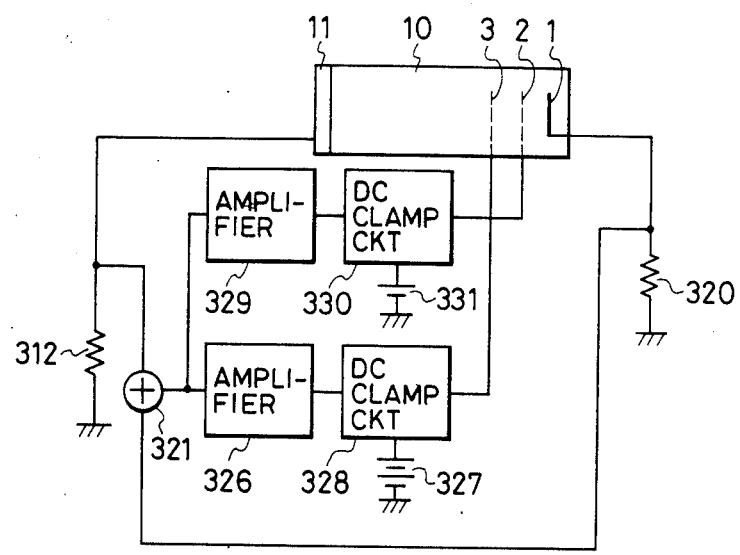
FIG. 11 is a schematic circuit diagram depicting a seventh embodiment of the present invention.

The seventh embodiment of FIG. 11 is a variation of the fifth embodiment in which the first and second grid electrodes 2 and 3 are simultaneously controlled. The signal corresponding to the return beam current is amplified by the amplifier 326 and is added to the voltage of the bias voltage source 327 by use of the dc clamp circuit 328, and then the resultant voltage is applied to the second grid electrode 3. The 1/n of the control signal applied to the second grid electrode 3 is generated by the amplifier 329 and the obtained voltage is added to the voltage of the bias voltage source 331 by use of the dc clamp circuit 330, and then the resultant voltage is added to the first grid electrode 2. The ABO operation of the seventh embodiment is also the same as that of the fifth embodiment of FIG. 8.

According to the embodiments 4–7 of the present invention, the first grid electrode is operated with a voltage positive with respect to the cathode and the amount of the scanning electron beam is controlled by the signal corresponding to the return beam from the photoconductive target, which enables the image pickup tube to effect a stable control on the amount of the electron beam without causing the oscillation even when a capacitive coupling exists between the first grid electrode and the photoconductive target and the beam becomes insufficient during the ABO operation.

What is claimed is:

1. A method for controlling the amount of an electron beam of an image pickup tube including a cathode, a first grid electrode disposed as a next stage of said cathode and provided with an aperture, a second grid electrode disposed as a next stage of said first grid electrode and provided with an aperture, and a photoconductive target, comprising the steps of:
   operating said first grid electrode with a voltage positive with respect to said cathode; and
   applying a signal voltage corresponding to a signal current obtained from said photoconductive target to said second grid electrode with a polarity opposite to a polarity of a signal charge generated on said photoconductive target.

2. A method according to claim 1 wherein said signal voltage corresponding to the signal current is simultaneously applied to said first grid electrode and said second grid electrode of the image pickup tube, and the signal applied to said first grid electrode has an amplitude which is smaller than an amplitude of the signal applied to said second grid electrode.

3. A method according to claim 2 further comprising the step of detecting said signal voltage equal to or more than a predetermined value wherein said first grid electrode and said second grid electrode are supplied with signal voltages each equal to or more than the predetermined value.

4. A method for controlling the amount of an electron beam of an image pickup tube including a cathode, a first grid electrode disposed as a next stage of said cathode and provided with an aperture, a second grid electrode disposed as a next stage of said first grid electrode and provided with an aperture, and a photoconductive target, comprising the steps of:
   operating said first grid electrode with a voltage positive with respect to said cathode; and
   applying a signal corresponding to a return beam from said photoconductive target to said second grid electrode with a polarity opposite to a polarity of a signal charge generated on said photoconductive target.

5. A method according to claim 4 wherein said signal corresponding to the return beam is simultaneously applied to said first grid electrode and said second grid electrode of the image pickup tube, and the signal applied to said first grid electrode has an amplitude which is smaller than an amplitude of the signal applied to said second grid electrode.

6. A method according to claim 4 wherein said signal corresponding to the return beam is obtained from a cathode current of said image pickup tube and a signal current corresponding to a scene illuminance.

7. A method according to claim 5 wherein said signal corresponding to the return beam is obtained from a cathode current of said image pickup tube and a signal current corresponding to a scene illuminance.

8. An apparatus for controlling the amount of an electron beam of an image pickup tube including a cathode, a first grid electrode disposed as a next stage of said cathode and provided with an aperture, a second grid electrode disposed as a next stage of said first grid electrode and provided with an aperture, and a photoconductive target, comprising:
    means for supplying a voltage positive with respect to the cathode to said first grid electrode;
    means for generating a signal voltage corresponding to a signal current obtained from said photoconductive target; and
    means for applying the generated signal voltage to said second grid electrode with a polarity opposite to a polarity of a signal charge generated on said photoconductive target.

9. An apparatus according to claim 8 further comprising:
    means for attenuating the amplitude of said signal voltage to be less than the amplitude of the signal voltage applied to said second grid electrode; and
    means for applying the attenuated signal voltage to said first grid electrode.

10. An apparatus according to claim 9 further comprising means for detecting said signal voltage equal to or more than a predetermined value, said first grid electrode and said second grid electrode being supplied with signal voltages each equal to or more than the predetermined value.

11. An apparatus for controlling the amount of an electron beam of an image pickup tube including a cathode, a first grid electrode disposed as a next stage of said cathode and provided with an aperture, a second grid electrode disposed as a next stage of said first grid electrode and provided with an aperture, and a photoconductive target, comprising:
    means for supplying a voltage positive with respect to the cathode to said first grid electrode;
    means for generating a signal corresponding to a return beam from said photoconductive target; and
    means for applying the generated signal to said second grid electrode with a polarity opposite to a polarity of a signal charge generated on said photoconductive target.

12. An apparatus according to claim 11 further comprising:
    means for attenuating the amplitude of said signal to be less than the amplitude of the signal applied to said second grid electrode; and
    means for applying the attenuated signal to said first grid electrode.

13. An aparatus according to claim 11 wherein said means for generating said signal corresponding to the return beam is means for adding a voltage generated by a resistor inserted into a cathode current path of said image pickup tube to a voltage generated by a resistor inserted into a path of the signal current obtained from said photoconductive target.

14. An apparatus according to claim 12 wherein said means for generating said signal corresponding to the return beam is means for adding a voltage generated by a resistor inserted into a cathode current path of said image pickup tube to a voltage generated by a resistor inserted into a path of the signal current obtained from said photoconductive target.

15. A method according to claim 1, wherein the image pickup tube includes only two grid electrodes comprising said first grid electrode and said second grid electrode, said signal voltage corresponding to said signal current obtained from said photoconductive target being applied to said second grid electrode in a manner which prevents oscillation from occurring.

16. A method according to claim 4, wherein the image pickup tube includes only two grid electrodes comprising said first grid electrode and said second grid electrode, said signal voltage corresponding to said return beam from said photoconductive target being applied to said second grid electrode in a manner which prevents oscillation from occurring.

17. An apparatus according to claim 8, wherein said image pickup tube includes only two grid electrodes comprising said first and second grid electrodes, and said means for applying the generated signal voltage to said second grid electrode applies the generated signal voltage for enabling preventing of oscillation.

18. An apparatus according to claim 11, wherein said image pickup tube includes only two grid electrodes comprising said first and second grid electrodes, and said means for applying the generated signal voltage to said second grid electrode applies the generated signal voltage for enabling preventing of oscillation.

* * * * *